April 26, 1938.     P. KNOPF     2,115,530
ROTATING INDICATOR DIAL
Filed Jan. 4, 1936
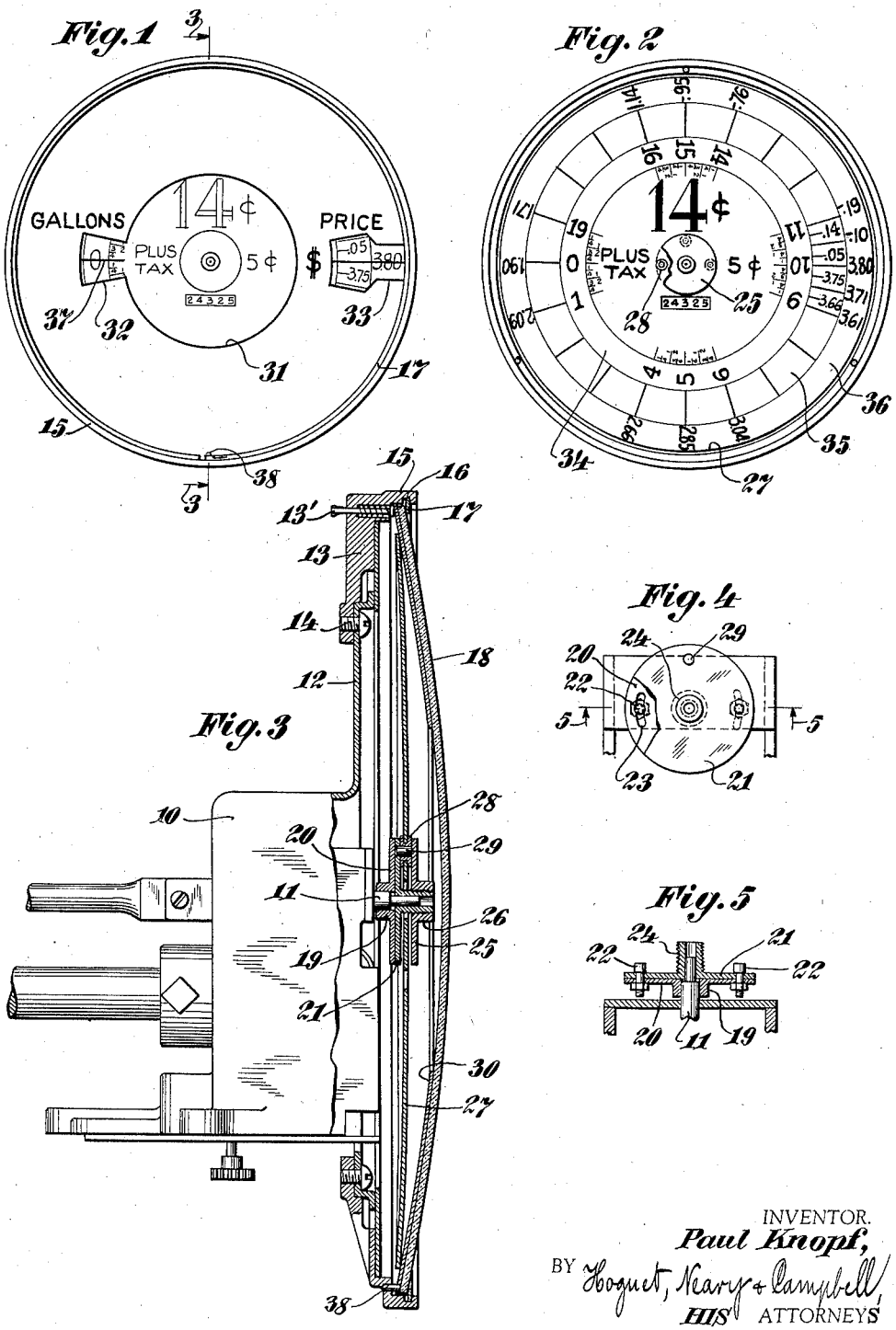
INVENTOR.
Paul Knopf,
BY Hoguet, Neary & Campbell
HIS ATTORNEYS Patented Apr. 26, 1938

2,115,530

UNITED STATES PATENT OFFICE 2,115,530

ROTATING INDICATOR DIAL

Paul Knopf, New York, N. Y.

Application January 4, 1936, Serial No. 57,507

2 Claims. (Cl. 40—70)

The present invention relates to indicators and embodies, more specifically, an improved indicator having a dial thereon upon which volume and price indicia are inscribed in order that corresponding indications can be given by the indicating mechanism.

The trend of indicators for indicating gasoline sales has recently been toward the type of indicator by means of which the price indication is indicated, as well as the volume of gasoline dispensed in order that the customer may not only order gasoline by price but also be advised as to the quantity of gasoline received for a given price, or as to the price of a given volume of gasoline ordered.

Inasmuch as meters previously used indicated the volume of the fluid dispensed, certain new designs of meters and indicators have incorporated therein mechanism driven by a common power shaft for indicating price as well as volume. In accordance with the present invention, it is proposed to provide, for use in connection with previous forms of meters which indicated volume only, a simple and readily applied dial mechanism by means of which price as well as volume may be indicated. In accordance with the invention it is further proposed to provide, in combination with a dial mechanism of the above character, means by which the dial may be effectively secured removably to the indicator shaft.

A further object of the invention is to provide, in combination with a dial of the above character, a cooperating crystal or glass, being formed in such fashion as to be readily installed or removed, as well as being readily positioned to provide a desired zero reading.

Further objects of the invention will be apparent as it is described in greater detail in connection with the accompanying drawing, wherein Figure 1 is a front view of an indicator constructed in accordance with the present invention;

Figure 2 is a view similar to Figure 1 showing the rotatable dial of the indicator with the crystal or glass removed;

Figure 3 is an enlarged view in section, taken on line 3—3 of Figure 1, and looking in the direction of the arrows;

Figure 4 is a detail view of the mechanism by means of which the dial is secured to the indicator shaft; and Figure 5 is a view in section, taken on the line 5—5 of Figure 4, and looking in the direction of the arrows.

Referring to the above drawing, an indicator is shown having a casing 10 within which an indicator power shaft 11 is received and driven by a suitable mechanism from a metering device. The casing 10 is formed with an enlarged flanged portion 12 the periphery of which is preferably concentric with the indicator power shaft 11. Upon this periphery is provided a rim 13 which may be secured to the flanged portion 12 by means of screws 14.

The rim 13 is provided with a cylindrical portion 15 within which a peripheral groove 16 is formed to receive a locating ring 17 by means of which a crystal or glass 18 may be secured in position.

Upon the indicator power shaft 11 which in many existing forms of meters receives the indicator finger is mounted a sleeve 19 upon which a flanged portion 20 is formed. A plate 21 is adapted to be secured to the flanged portion 20 by means of bolts 22 the connection between the plate 21 and the flanged portion 20 being adjustable to permit angular adjustment of the plate 21 with respect to the flanged portion 20. Such adjustment is afforded by providing arcuate slots 23 in the plate 21 the positioning bolts 22 extending through such slots and securing the elements in a desired position as illustrated in Figure 5. The plate 21 is provided with a threaded hub 24 upon which a retaining plate 25 is mounted by means of a threaded hub portion 26 formed thereon. Between the plate 21 and the retaining plate 25 a dial 27 is adapted to be received, the dial being provided with an eyelet 28 mounted therein. Upon the plate 21 a pin 29 is secured, the pin being adapted to receive the eyelet 28 in order that motion between the shaft 11 and the dial 27 may be effected positively. By the adjustable connection between the plate 21 and the flanged portion 20, as above described, proper indexing of the dial 27 is effected, the plate 21 preferably being secured to the flanged portion 20 with the pin 29 in a vertical plane passing through the axis of the shaft 11 and located directly above such shaft. In this fashion, with indicia inscribed on the dial 27 properly with respect to such indexing, the dial may be secured to the shaft 11 in such fashion that the zero indication thereof is substantially uniformly placed with respect to the housing. Beneath the transparent crystal or glass 18 is a disc 30 which is preferably opaque save for a central portion 31 and openings 32 and 33. The disc 30 obviously may be formed either with cutaway or open portions 31, 32, and 33 or may be transparent in such areas in order that indications of the dial may be read through the crystal 18.

The dial, in order to indicate gallons or volume as well as price, is provided with an annular series of numbers in an annular ring 34 (Figure 2). These numbers serve as indications of volume and are viewed through the opening or transparency 32. The price indication is viewed through the opening 33 and is given by indicia inscribed preferably in one or more annular portions 35 and 36 of the dial 27. As shown in Figure 1, the opening 33 is of such character that, when one price indication in the annular space 36 is viewed, two price indications in the annular space 35 are viewed, these price indications corresponding to the next lower and higher indication than the price indication viewed on the annular space 36.

At the center of the dial 27, suitable indicia may be applied to be viewed through the opening or transparency 31. These indicia may include the unit price per volume of the fluid as well as additional taxes, etc.

After indexing the dial 27 as described above, the disc 30 is positioned in such fashion that indicating lines 37 thereon correspond with the zero position or marking on the dial 27. When the disc 30 is so located, it may be effectively secured in such position by means of a pin 38 located at any convenient point on the indicator. In this fashion, proper registry of the zero line 37 of the disc 30 with the zero marking on the disc may be assured at all times, thus correcting any error which might creep into the mechanism as a result of long or improper use. A spring pressed plunger 13' may be provided to maintain the disc 30 and crystal 18 yieldingly against the positioning ring 17.

It will thus be seen that a simple and effective conversion mechanism has been provided by means of which existing forms of meters which indicate only volume can be adapted to indicate price as well as volume, the mechanism being simple and effective in operation, as well as being readily installed or removed. Obviously, the meter attendant replaces the dials 26 with proper dials whenever there is a price change, substituting a dial having indicia thereon corresponding to a desired unit price.

While the invention has been described with specific reference to the construction shown in the accompanying drawing, it is not to be limited, save as defined in the appended claims.

I claim:

1. An indicating device adapted to be actuated by an indicator shaft, said device comprising a member rotatable about its center, an annular series of price indicia on the member, an annular series of indicia representing volume adapted to be related to the price indicia, an opaque disc in front of the said rotatable member having apertures therein, through which the indicia may be viewed, the said apertures being respectively common to each of the said annular series of indicia and indicia within the two said annular series on the member indicating the unit price per unit of volume, whereby the member may be secured as a unit to an indicator shaft at a desired zero position and indicate through suitable apertures the volume and price of a fluid dispensed as well as the unit price by which the total price is computed.

2. An indicating device adapted to be actuated by an indicator shaft, said device comprising a movable element adapted to be moved in a fixed path, a series of price indicia on the movable element arranged in a path parallel to the fixed path of movement of the movable element, a series of indicia on the movable element representing volume arranged in a path parallel to the fixed path of movement of the movable element, said last named series being adapted to be related to the respective price indicia, an opaque cover member for the said movable element having apertures formed therein, through which said indicia are adapted to be viewed, the said apertures being common respectively to each of the said series of indicia, and indicia on the movable element indicating the unit price per unit of volume, the last named indicia being adapted to be viewed simultaneously with all related indicia in the two first mentioned series of indicia as viewed through the said apertures in the opaque cover member, whereby the movable element may be secured as a unit to an indicator shaft at a desired zero position and indicate through suitable apertures the volume and total price of a fluid dispensed as well as the unit price by which the total price is computed.

PAUL KNOPF.